(12) United States Patent
Sata et al.

(10) Patent No.: US 7,525,084 B2
(45) Date of Patent: Apr. 28, 2009

(54) INPUT DEVICE, ELECTRONIC APPARATUS AND METHOD FOR CONTROLLING INPUT DEVICE

(75) Inventors: Norifumi Sata, Hyogo (JP); Naoki Tatehata, Kyoto (JP)

(73) Assignee: Panasonic Corporation, Osaka (JP)

( * ) Notice: Subject to any disclaimer, the term of this patent is extended or adjusted under 35 U.S.C. 154(b) by 60 days.

(21) Appl. No.: 11/697,391

(22) Filed: Apr. 6, 2007

(65) Prior Publication Data

US 2007/0241264 A1 Oct. 18, 2007

(30) Foreign Application Priority Data

Apr. 17, 2006 (JP) ............... 2006-113154

(51) Int. Cl.
*G01J 1/36* (2006.01)
*G06M 7/00* (2006.01)
*G01J 1/32* (2006.01)

(52) U.S. Cl. ............... 250/227.22; 250/221; 250/205

(58) Field of Classification Search ........... 250/227.22, 250/227.14, 227.24, 221, 214 LS, 205; 345/173–177; 200/600, 512; 340/407.1, 407.2
See application file for complete search history.

(56) References Cited

U.S. PATENT DOCUMENTS 6,215,476 B1 * 4/2001 Depew et al. ............... 345/173
6,822,640 B2 * 11/2004 Derocher ............... 345/173
7,382,360 B2 * 6/2008 Mackey et al. ............... 345/173
2004/0105040 A1 6/2004 Oh et al.

FOREIGN PATENT DOCUMENTS

| EP | 0 802 476 A2 | 10/1997 |
| JP | 07 129320 A | 5/1995 |
| JP | 07 295746 A | 11/1995 |
| JP | 2005-346402 | 12/2005 |

OTHER PUBLICATIONS

International Search Report for Application No. 07 10 6235 dated Aug. 22, 2007.
European Search Report for Application No. 07 10 6235 dated Aug. 31, 2007.

* cited by examiner

*Primary Examiner*—Georgia Y Epps
*Assistant Examiner*—Pascal M Bui-Pho
(74) *Attorney, Agent, or Firm*—RatnerPrestia

(57) ABSTRACT

An input device includes an input detection portion which enables detection of position inputs according to change of capacitance; a position detection portion which reads detection signals from the input detection portion and detects positions thereof; a light emitting portion placed near the input detecting portion; driving portion which drives the light emitting portion; a monitoring portion which monitors a driving voltage applied from the driving portion to the light emitting portion; and a control portion which controls a generation of pulse signals at times when the position detection portion reads the position inputs from the input detection portion, the generation of the times being based on the driving voltage monitored by the monitoring portion.

8 Claims, 5 Drawing Sheets

INPUT DEVICE, ELECTRONIC APPARATUS AND METHOD FOR CONTROLLING INPUT DEVICE

BACKGROUND OF THE INVENTION

1. Field of the Invention

The present invention relates an input device for use in inputting operations for various types of electronic apparatuses, an electronic apparatus, and a method for controlling an input device.

2. Description of the Related Art

There have been a large number of commercial push-button type input devices, as input devices for use in inputting operations for electronic apparatuses such as cellular phones.

However, in recent years, along with advancing size reduction of such apparatuses, it has become increasingly difficult to secure spaces for installing such input devices.

In view of the circumstances, there have been suggested, for example, electronic apparatuses including sensors which sense change of capacitances due to fingers touching thereon and perform inputting and also including sheet-type EL (Electroluminescence) devices capable of light emission which are placed on the sensors, in order to improve viewability of its operation portions and to realize thickness reduction (refer to, for example, Japanese Patent Unexamined Publication No. 2005-346402).

The structure of such a conventional electronic apparatus will be described. FIG. 7 is a cross-sectional view for describing the structure of the conventional electronic apparatus.

Referring to FIG. 7, electronic apparatus 100 includes cabinet 101 and also includes, as an input device, sensor 102 and light emitting device 103 as an EL element, which are placed within cabinet 101 such that they are overlaid on each other. In this example, light emitting device 103 is provided on the front surface of cabinet 101, while sensor 102 is placed on the back surface of light emitting device 103.

Sensor 102 is a capacitive type sensor capable of detecting finger 104 of a user touching thereon, with cabinet 101 and light emitting device 103 interposed therebetween. In the case of employing such a capacitive type sensor, when finger 104 approaches the operation surface, a part of electric charge accumulated in sensor 102 is fed to finger 104, resulting in reduction of a capacitance value. The capacitive type sensor can detect finger 104 touching thereon, by detecting the change of the capacitance value.

Sensor 102 has a thin sheet shape and is mounted to light emitting device 103 with an adhesive material or the like.

The EL element used as light emitting device 103 has a thin sheet shape and is mounted to the back surface of cabinet 101 with an adhesive material or the like. In this example, the EL element is configured to emit light when a luminescent substance therein is excited by an electric field and is capable of emitting uniform light over a wide range.

As described above, conventional electronic apparatus 100 can be made thinner in comparison with electronic apparatuses including push-button type input devices and also is capable of emitting light from light emitting device 103 during operations, thereby improving viewability of its operation portion.

However, conventional electronic apparatus 100 has a problem of noises generated when the EL element as light emitting device 103 is driven, wherein such noises may influence the capacitive type sensor, thereby preventing it from detecting fingers touching thereon and positions with high accuracy.

SUMMARY OF THE INVENTION

The present invention is made in view of the aforementioned conventional problem and aims to provide an input device, an electronic apparatus and a method for controlling the input device which are capable of detecting touches and positions (coordinates) with higher stability and higher accuracy while emitting light from a light emitting device, even with a capacitive type sensor employed therein and the light emitting device placed near the capacitive type sensor.

An input device according to the present invention includes an input detection portion which enables position inputs according to change of capacitance, a position detection portion which reads the position inputs from the input detection portion and detects the positions, a light emitting portion placed near the input detecting portion, a driving portion which drives the light emitting portion, a monitoring portion which monitors a driving voltage applied from the driving portion to the light emitting portion, and a control portion which controls timings when the position detection portion reads the position inputs from the input detection portion based on the driving voltage monitored by the monitoring portion.

With the aforementioned structure, the control portion controls the timings when the position detection portion reads the position inputs from the input detection portion based on the driving voltage monitored by the monitoring portion. Accordingly, it is possible to provide an input device capable of detecting touches and positions with higher stability and higher accuracy, while emitting light from the light emitting device, even with a capacitive type sensor employed therein and the light emitting device placed near the capacitive type sensor.

Also, the control portion may cause the position detection portion to read the position inputs from the input detection portion, when the driving voltage monitored by the monitoring portion is in areas other than switching areas in which the driving portion raises the voltage applied to the light emitting portion.

With the aforementioned structure, it is further possible to suppress influence of switching noises, thereby enabling detection of touches with higher stability.

Also, the control portion may cause the position detection portion to read the position inputs from the input detection portion at times of zero-crossing of the driving voltage monitored by the monitoring portion.

With the aforementioned structure, it is further possible to reduce the influence of noises caused by change of the driving voltage. Further, in a case where the voltage applied to drive the light emitting portion is an AC voltage, it is possible to cause the position detection portion to read the position inputs according to a period of the AC voltage.

Also, the driving portion may supply intermittently the driving voltage to the light emitting portion, and the control portion can cause the position detection portion to read the position inputs from the input detection portion during OFF time in which the driving voltage monitored by the monitoring portion is not supplied to the light emitting portion.

With the aforementioned structure, the control portion further causes the position detection portion to read the position inputs from the input detection portion during the OFF time in which the driving voltage is not supplied to the light emitting portion, thereby reducing the influence of noises caused by the change of the driving voltage.

Also, the control portion may cause the position detection portion to read the position inputs from the input detection portion when the driving voltage monitored by the monitoring portion is in areas other than switching areas in which the driving portion raises the voltage applied to the light emitting portion, during ON time in which the driving voltage monitored by the monitoring portion is supplied to the light emitting portion.

With the aforementioned structure, it is further possible to suppress the influence of switching noises, even during the ON time in which the driving voltage is supplied to the light emitting portion, thereby enabling detection of touches with higher accuracy.

Also, the input detection portion may have a transparent member and a transparent electrode, and the light emitting portion can have an EL element placed on the back surface of the input detection portion.

With the aforementioned structure, it is further possible to make the input detection portion transparent so as to place the light emitting portion on the back surface of the input detection portion, thereby enabling placing the input detection portion closer to an object. Such a structure enables detecting the touch of the object with higher accuracy.

Next, an electronic apparatus according to the present invention includes an input device according to the present invention.

With the aforementioned structure, the control portion in the input device controls the timings when the position detection portion reads position inputs from the input detection portion based on the driving voltage monitored by the monitoring portion. Accordingly, it is possible to provide an electronic apparatus capable of detecting touches and positions with higher stability and higher accuracy while emitting light from a light emitting device, even with a capacitive type sensor used therein and the light emitting device placed near the capacitive type sensor.

Next, a method for controlling an input device according to the present invention is a method for controlling an input device including an input detection portion which enables position inputs according to change of capacitance, a position detection portion which reads the position inputs from the input detection portion and detects the positions, a light emitting portion placed near the input detecting portion, a driving portion which drives the light emitting portion, and a monitoring portion which monitors driving voltage applied from the driving portion to the light emitting portion, the method including the step of controlling timings when the position detection portion reads the position inputs from the input detection portion based on the driving voltage monitored by the monitoring portion.

With the aforementioned method, it is possible to provide a method for controlling an input device capable of detecting touches with higher stability and higher accuracy while emitting light from a light emitting device, even with a capacitive type sensor employed therein and the light emitting device placed near the capacitive type sensor, since the method includes the step of controlling the timings when the position detection portion reads the position inputs from the input detection portion based on the driving voltage monitored by the monitoring portion.

As described above, with the present invention, there are provided an input device, an electronic apparatus and a method for controlling the input device which are capable of detecting touches and positions with higher stability and higher accuracy while emitting light from a light emitting device, even with a capacitive type sensor used therein and the light emitting device placed near the capacitive type sensor.

DESCRIPTION OF THE PREFERRED EMBODIMENTS

Hereinafter, embodiments of the present invention will be described with reference to the drawings.

Embodiments

Figure 1:
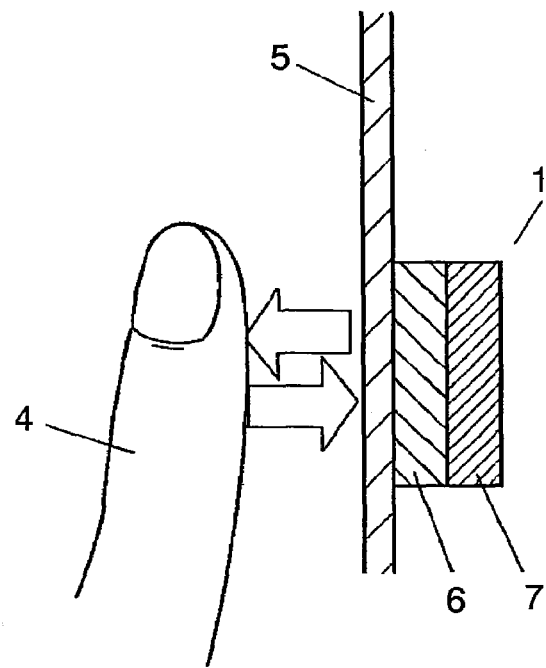
FIG. 1 is a cross-sectional view for describing the structure of an input device according to an embodiment of the present invention.

First, there will be described the structure of an input device according to an embodiment of the present invention. FIG. 1 is a cross-sectional view for describing the structure of input device 1 according to the embodiment of the present invention. Input device 1 according to the present embodiment will be described as being mounted in an electronic apparatus such as a cellular phone apparatus or the like.

As illustrated in FIG. 1, input device 1 includes operation panel 5 made of a resin and the like, position input sheet 6 (coordinate input sheet) placed on the back surface of operation panel 5 as an input detection portion for inputting positions (coordinates) according to change of capacitance when finger 4 approaches it, and EL element 7 placed on the back surface of position input sheet 6 as a sheet-type light emitting portion.

Position input sheet 6 is fabricated by forming a transparent electrode made of ITO (Indium-tinoxide), a conducting polymer or the like on a base film as a transparent member made of PET (polyethylene terephthalate). Further, position input sheet 6 has flexibility and is attached to the back surface of operation panel 5 with an adhesive agent and the like.

Figure 2:
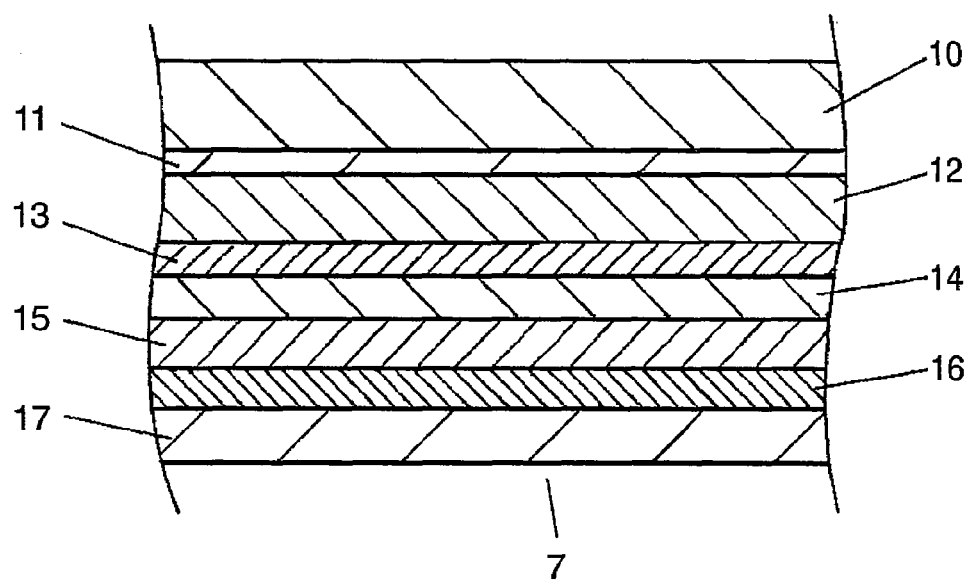
FIG. 2 is a cross-sectional view illustrating the configuration of an EL element in the input device.

Hereinafter, the configuration of EL element 7 will be described in detail. FIG. 2 is a cross-sectional view illustrating the configuration of EL element 7 in input device 1. In FIG. 2, the upward direction in the drawing is a direction in which EL element 7 is faced to position input sheet 6.

As illustrated in FIG. 2, EL element 7 is provided with transparent electrode 11 made of ITO, a conducting polymer or the like on the under surface of base film 10 made of PET. Further, EL element 7 has a multi-layer configuration of light emitting layer 12, dielectric layer 13, back-surface electrode 14 having a conductive material, insulation layer 15 having an insulation material, shield electrode 16 having a conductive material for shielding against downward noises, and insulation layer 17 having an insulation material, which are laminated in the mentioned order under transparent electrode 11.

EL element 7 has flexibility. EL element 7 is attached to position input sheet 6 with an adhesive layer (not illustrated) partially placed thereon, at the upper surface of base film 10 in FIG. 2.

As described above, in input device 1 according to the present embodiment, position input sheet 6 has a transparent member and is placed on the front surface of EL element 7 so as to be closer to operation panel 5. This allows light from EL element 7 to pass clearly through position input sheet 6 and also makes finger 4 closer to position input sheet 6 during operation, thereby enabling detection of the operated position with higher stability and higher accuracy, without increasing detection sensitivity of position input sheet 6 more than necessary.

Figure 3:
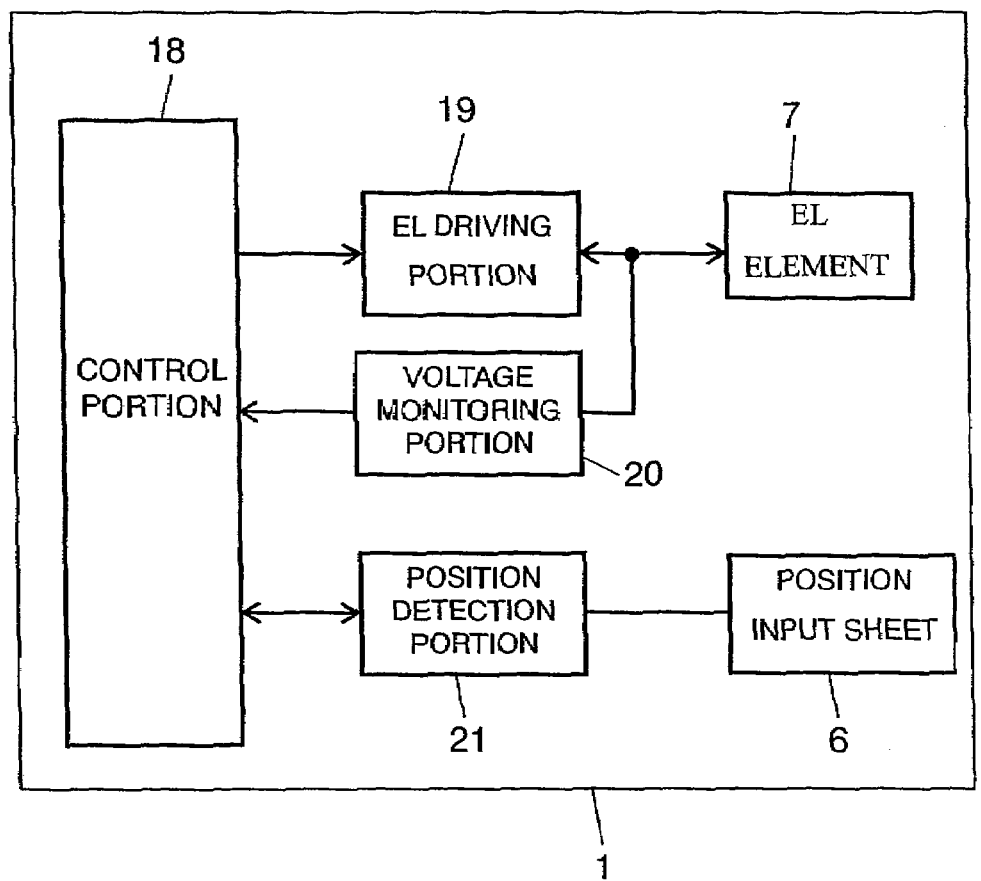
FIG. 3 is a block diagram illustrating the structure of the input device.

Next, the electric structure of input device 1 will be described. FIG. 3 is a block diagram illustrating the electric structure of input device 1 according to the embodiment of the present invention.

As illustrated in FIG. 3, input device 1 includes EL driving portion 19 which applies a driving voltage to EL element 7 to drive EL element 7, voltage monitoring portion 20 which monitors the driving voltage applied to EL element 7 by EL driving portion 19, position detection portion 21 (coordinate detection portion) which reads detection signals output from position input sheet 6 and detects the coordinate positions touched, and control portion 18 which controls driving by EL driving portion 19, monitoring by voltage monitoring portion 20, and reading of detection signals and detection of the coordinate positions by position detection portion 21.

Hereinafter, operations of aforementioned input device 1 will be described.

Figure 4:
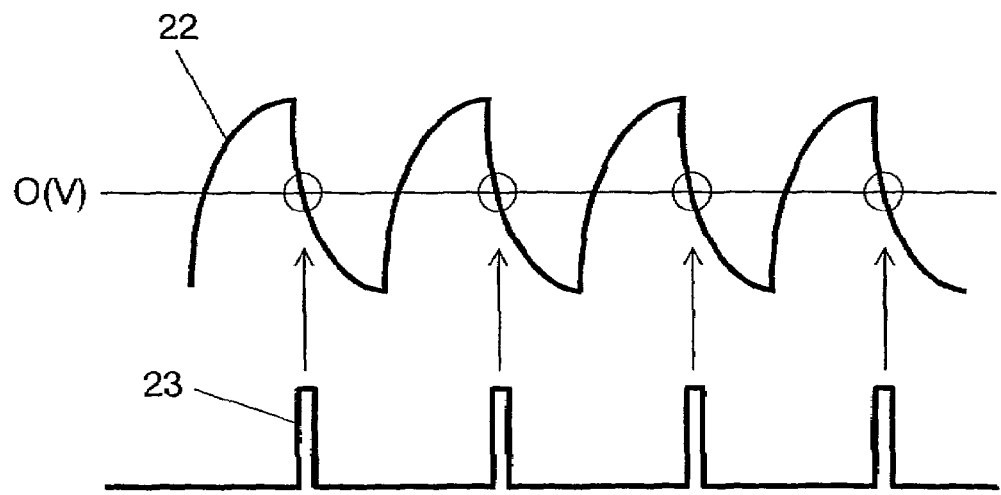
FIG. 4 is a view illustrating the relationship between a waveform of the EL driving voltage in the input device and timings of reading detection signals.

First, when turning on the EL element 7, control portion 18 sends to EL driving portion 19 a command for applying a driving voltage to EL element 7. Accordingly, EL driving portion 19 applies periodic driving voltage (hereinafter, referred to as an EL driving voltage) 22 to EL element 7. FIG. 4 is a view illustrating the relationship between a waveform of EL driving voltage 22 and timings of reading detection signals in input device 1.

Further, EL driving voltage 22 is applied to the portion of EL element 7 between transparent electrode 11 and back-surface electrode 14 illustrated in FIG. 2.

When EL driving voltage 22 is applied to EL element 7, light emitting layer 12 emits light, so that operation panel 5 is irradiated with the light through position input sheet 6.

Light emitting layer 12 can illuminate either a partial area of operation panel 5 or the entire area of operation panel 5. For example, light emitting layer 12 can illuminate the area touched by finger 4 to notify a user of the touched area, or can illuminate areas to be touched to notify the user of the areas to be touched by a finger. Light emitting layer 12 can illuminate the entire area of operation panel 5 to notify the user of the positions of all operation positions.

As EL driving voltage 22 for EL element 7, an AC voltage in the range of several tens of volts (V) to approximately 100 volts (V) is applied thereto, in general. Accordingly, it can be considered that, when EL driving voltage 22 is applied to EL element 7, EL element 7 is in a state of being prone to generate noises to its periphery.

To address such noises, in input device 1, as illustrated in FIG. 3, voltage monitoring portion 20 monitors EL driving voltage 22 and sends a notification to control portion 18 when EL driving voltage 22 is changed across 0 (V) so as to be changed in polarity (hereinafter, referred to as time of zero-crossing).

Input device 1 can be structured such that control portion 18 itself determines the value of EL driving voltage 22, without being provided with voltage monitoring portion 20.

On receiving the notification from voltage monitoring portion 20 (at the time of zero-crossing of EL driving voltage 22), control portion 18 causes position detection portion 21 to read detection signals from position input sheet 6 (read position (coordinate) inputs), by generating pulse signals 23 and the like, as illustrated in FIG. 4.

Then, position detection portion 21 reads detection signals from position input sheet 6 and detects change of capacitance at the timing of pulse signals 23 transmitted from control portion 18, then specifies the position operated by finger 4 based on the detection, and notifies control portion 18 of the positions.

As described above, in input device 1, as can be seen from FIG. 4, at the timings of zero-crossing of EL driving voltage 22, there are set timings when position detection portion 21 reads detection signals from position input sheet 6 and detects the operated positions.

Therefore, it is possible to suppress influence of noises generated by EL element 7 or EL driving portion 19 in detecting coordinate positions, even though EL element 7 is being driven. This enables detecting operated positions on position input sheet 6 with higher stability and higher accuracy, without increasing detection sensitivity of position input sheet 6 more than necessary.

While, in the example illustrated in FIG. 4, pulse signals 23 for operated-position detection are generated at every other timing, among the timings of zero-crossing of EL driving voltage 22, control portion 18 can control the timings of operated-position detection so as to detect the operated positions at all the timings, depending on driving frequency for EL element 7.

On the contrary, it is possible to detect the operated positions at a less number of timings than the number of timings illustrated in FIG. 4 out of the timings of zero-crossing of EL driving voltage 22, depending on the driving frequency for EL element 7.

Hereinafter, there will be described the timings of detection of the operated positions (position inputs) in association with EL driving voltage 22, in more detail.

Figure 5:
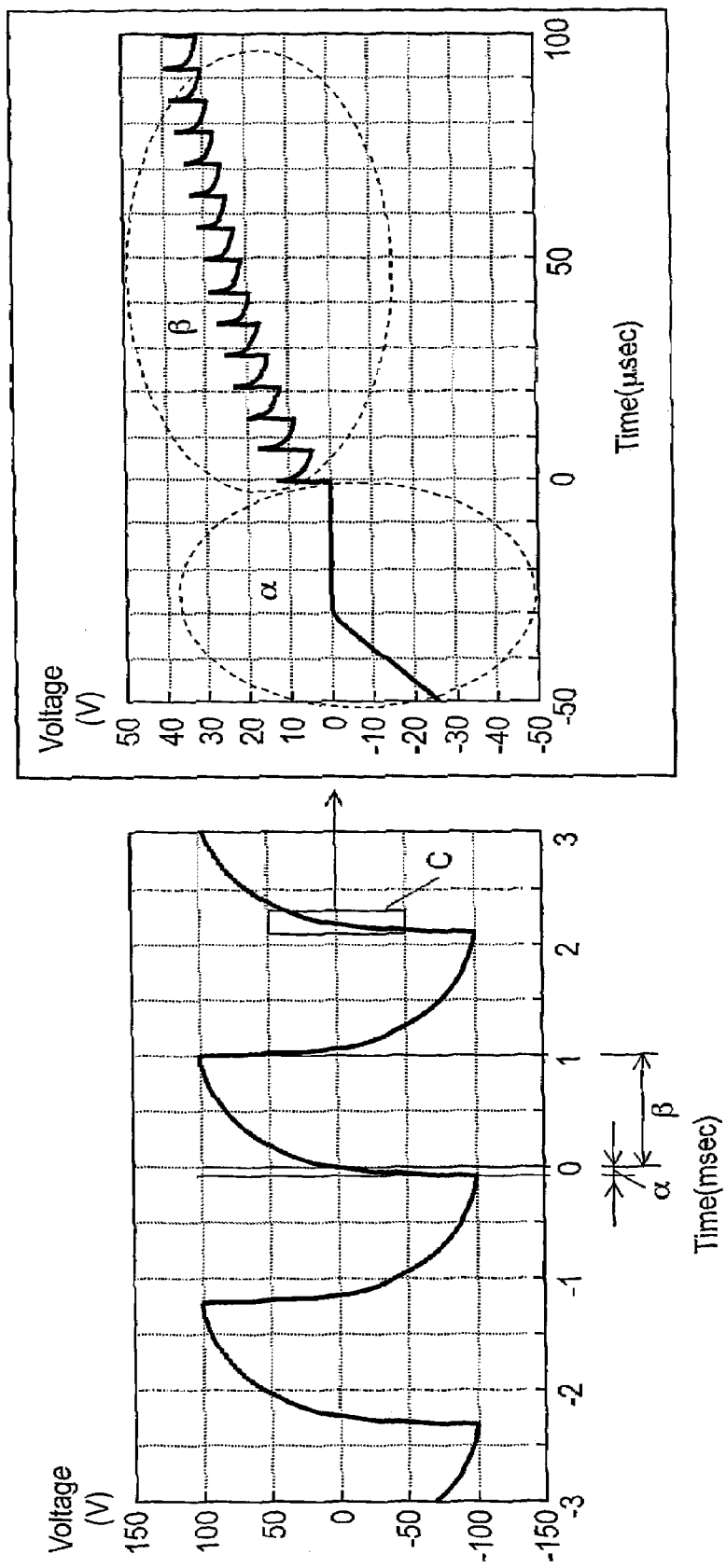
FIG. 5 is a view for describing timings of detecting operated positions in the input device.

FIG. 5 is a view for describing timings of detection of operated positions in input device 1 according to the embodiment of the present invention.

In FIG. 5, there is illustrated, on the left side, an example of data of actually measured EL driving voltage 22, while there is illustrated, on the right side thereof, an enlarged waveform of EL driving voltage 22 around 0 (V) illustrated in an area C (so-called, around zero-crossing).

As illustrated in the right side of FIG. 5, in the area C around the zero-crossing of EL driving voltage 22, there are a part of area α in which the waveform is changed relatively smoothly and becomes flat at 0 (V) and a part of area β in which the waveform is changed in a stepwise manner.

The area β is a switching area in which EL driving portion 19 raises EL driving voltage 22. These switching correspond to noises which have been previously described, and may influence position detection on position input sheet 6 by position detection portion 21 as switching noises.

As a matter of cause, by causing position detection portion 21 to read signals from position input sheet 6 to detect the positions at the time point of zero-crossing of EL driving voltage 22, it is possible to suppress the influences of noises and switching noises caused by change of the voltage so as to enable position detection with higher accuracy. However, in practice, by causing position detection portion 21 to read the signals from position input sheet 6 for position detection in area α near zero-crossing, it is possible to suppress at least the influence of switching noises so as to enable position detection with higher accuracy.

As described above, input device 1 can cause position detection portion 21 to read detection signals (read position inputs) from position input sheet 6 in area α around zero-crossing in which the voltage is relatively smooth, other than switching noise area β. Therefore, input device 1 is capable of detecting positions with higher stability and higher accuracy by suppressing the influence of the switching noises.

Further, while, in the present embodiment, there has been exemplified a case where EL driving portion 19 periodically applies EL driving voltage 22 to EL element 7, the present invention is not limited to the case.

Figure 6:
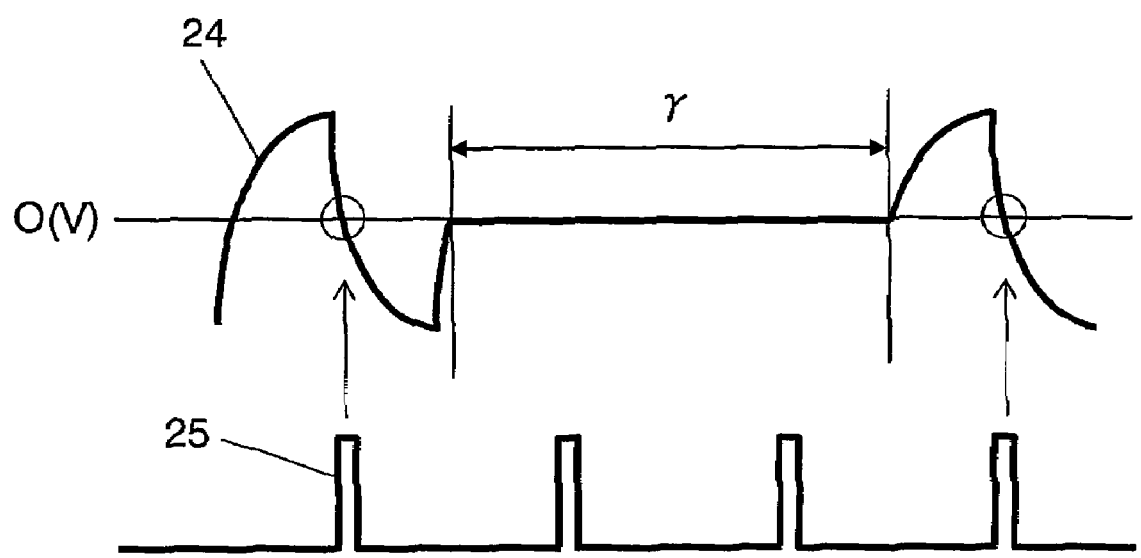
FIG. 6 is a view illustrating another example of the timings of reading the detection signals from a position input sheet in the input device.
Figure 7:
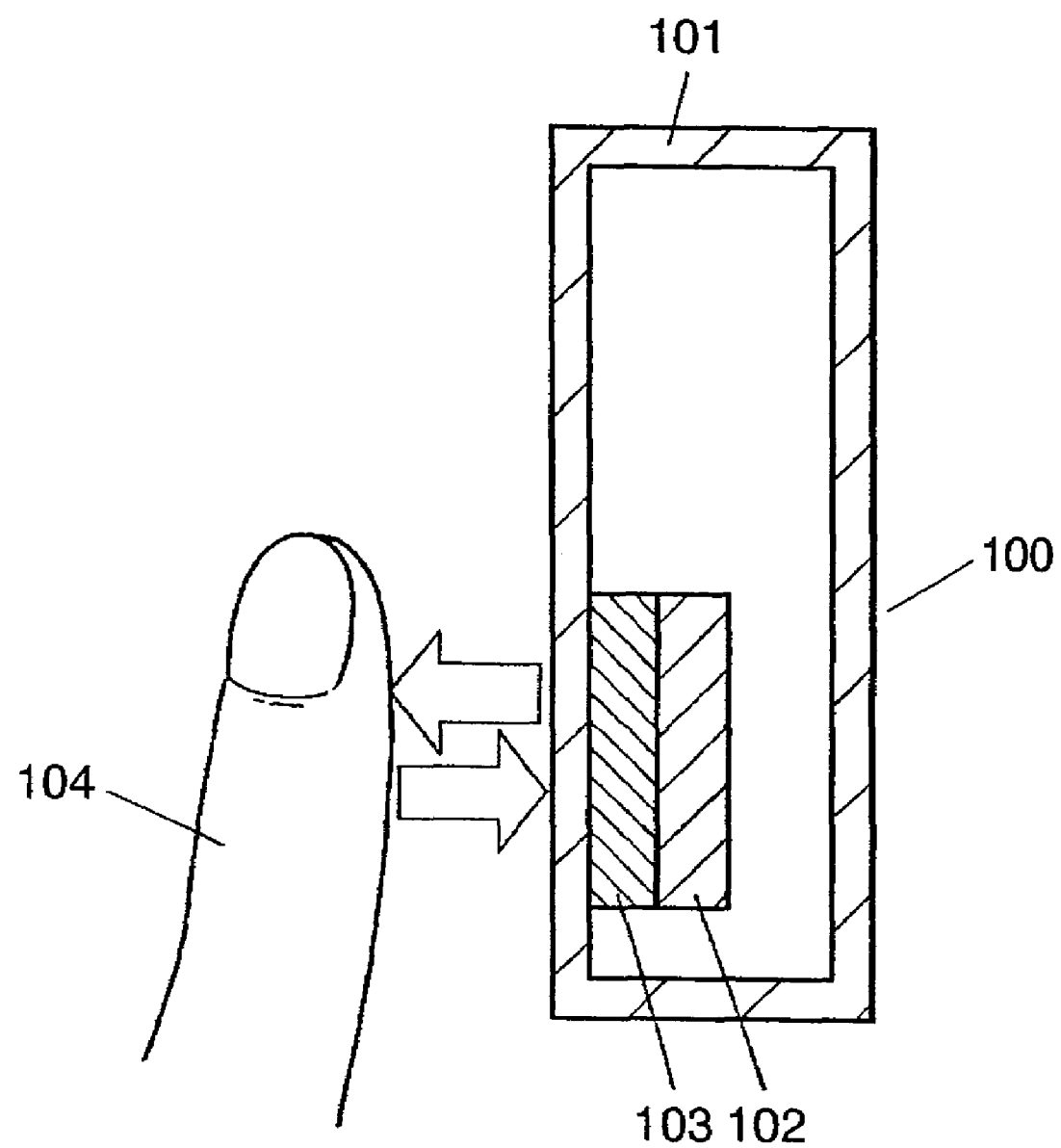
FIG. 7 is a cross-sectional view for describing the structure of a conventional electronic apparatus.

FIG. 6 is a view illustrating another example of timings of reading detection signals from position input sheet 6 in input device 1 according to the present embodiment. In the example illustrated in FIG. 6, EL driving portion 19 intermittently applies EL driving voltage 24 to EL element 7 and, therefore, EL driving voltage 24 has so-called OFF time γ in which no voltage is applied. In this example, control portion 18 generates pulse signals 25 during OFF time γ of EL driving voltage 24.

The aforementioned structure also enables detections of coordinate positions with higher accuracy, since the detections of coordinate positions are not influenced by noises and switching noises generated due to change of EL driving voltage 22 applied by EL driving portion 19.

Further, by causing control portion 18 to generate pulse signals 25 at the timings of areas α in which the voltage is relatively smooth, other than switching noise areas β, around the zero-crossing of EL driving voltage 24, even within time when the voltage is applied (ON time) other than OFF time γ of EL driving voltage 24, as illustrated in FIG. 6, it is possible to detect coordinate positions with higher accuracy.

Further, while, in the present embodiment, there has been exemplified a case where position input sheet 6 and EL element 7 which are formed separately are attached to each other, the present invention is not limited to the case. For example, a transparent electrode made of ITO, a conducting polymer or the like can be formed as a position input sheet on the upper surface of a base film and, also, respective layers constituting an EL element can be formed on the back surface of the base film to provide a unified structure having the functions of position input sheet 6 and EL element 7.

Further, while, in the present embodiment, position input sheet 6 and EL element 7 have been described as being placed in the aforementioned manner, namely such that EL element 7 is placed on the back surface of position input sheet 6, the present invention is not limited to the case. Position input sheet 6 can be placed on the back surface of EL element 7, namely, the positional relationship between position input sheet 6 and EL element 7 is inverted.

Further, while, in the present embodiment, there has been exemplified a case where EL element 7 is employed as a light emitting portion, the present invention is not limited to the case. The present invention can be applied to any other light emitting devices capable of emitting light by applying an AC driving voltage having a waveform as illustrated in FIG. 4 or a sawtooth waveform.

Further, while, in the present embodiment, input device 1 has been described as being mounted in a cellular phone apparatus, the present invention is not limited to the case. For example, the input device according to the present invention can be mounted in various types of electronic apparatuses, such as personal computers, PDAs, car navigation systems and the like.

As described above, with the present invention, there is offered a prominent advantage that, even when a capacitive type sensor is employed and a light emitting device is placed therearound, it is possible to detect contacts and positions with higher stability and higher accuracy while causing the light emitting device to emit light. Accordingly, the present invention is usable as an input device for use in inputting operations for various types of electronic apparatus, an electronic apparatus and a method for controlling an input device and the like.

The invention claimed is:

1. An input device comprising:
   an input detection portion which enables detection of position inputs according to a change of capacitance;
   a position detection portion which reads the position inputs from the input detection portion and detects positions thereof;
   a light emitting portion placed near the input detecting portion;
   a driving portion which drives the light emitting portion;
   a monitoring portion which monitors a driving voltage applied from the driving portion to the light emitting portion; and
   a control portion which controls a generation of pulse signals, the pulse signals being sent to the position detection portion at times when the position detection portion reads the position inputs from the input detection portion, the generation of the times being based on the driving voltage monitored by the monitoring portion.

2. The input device according to claim 1, wherein
   the control portion causes the position detection portion to read the position inputs from the input detection portion when the driving voltage monitored by the monitoring portion is in areas other than switching areas in which the driving portion raises the voltage applied to the light emitting portion.

3. The input device according to claim 2, wherein
   the times that the control portion causes the position detection portion to read the position inputs from the input detection portion is at times of zero-crossing of the driving voltage monitored by the monitoring portion.

4. The input device according to claim 1, wherein
   the driving portion intermittently supplies the driving voltage to the light emitting portion, and
   the control portion causes the position detection portion to read the position inputs from the input detection portion during OFF time in which the driving voltage monitored by the monitoring portion is not supplied to the light emitting portion.

5. The input device according to claim 4, wherein
   the control portion also causes the position detection portion to read the position inputs from the input detection portion when the driving voltage monitored by the monitoring portion is in areas other than switching areas in which the driving portion raises the voltage applied to the light emitting portion, during ON time in which the driving voltage monitored by the monitoring portion is supplied to the light emitting portion.

6. The input device according to claim 1, wherein
   the input detection portion has a transparent member and a transparent electrode, and
   the light emitting portion has an EL element placed on a back surface of the input detection portion.

7. An electronic apparatus comprising:
- an input detection portion which enables detection of position inputs according to a change of capacitance;
- a position detection portion which reads the position inputs from the input detection portion and detects positions thereof;
- a light emitting portion placed near the input detecting portion;
- a driving portion which drives the light emitting portion;
- a monitoring portion which monitors a driving voltage applied from the driving portion to the light emitting portion; and
- a control portion which controls a generation of pulse signals, the pulse signals being sent to the position detection portion at times when the position detection portion reads the position inputs from the input detection portion, the generation of the times being based on the driving voltage monitored by the monitoring portion.

8. A method for controlling an input device including an input detection portion which enables detection of position inputs according to a change of capacitance, a position detection portion which reads the position inputs from the input detection portion and detects positions thereof, a light emitting portion placed near the input detecting portion, a driving portion which drives the light emitting portion, and a monitoring portion which monitors a driving voltage applied from the driving portion to the light emitting portion, the method comprising the step of;
- controlling a generation of pulse signals, the pulse signals being sent to the position detection portion at times when the position detection portion reads the position inputs from the input detection portion, the generation of the times being based on the driving voltage monitored by the monitoring portion.

* * * * *